United States Patent [19]

Richards

[11] Patent Number: 4,599,495

[45] Date of Patent: Jul. 8, 1986

[54] APPARATUS FOR MULTIFREQUENCY SIGNALLING TONE DETECTION

[75] Inventor: Robert D. Richards, Ottawa, Canada

[73] Assignee: Northern Telecom Limited, Montreal, Canada

[21] Appl. No.: 706,823

[22] Filed: Feb. 28, 1985

[51] Int. Cl.⁴ ............................................. H04M 1/00
[52] U.S. Cl. ............................ 179/84 VF; 340/825.71
[58] Field of Search ................ 179/84 VF, 2 R, 2 A, 179/84 R, 81 R, 84 C, 84 SS, 84 A; 328/138; 340/825.71, 825.73, 825.74, 825.75, 825.76

[56] References Cited

U.S. PATENT DOCUMENTS

| 3,912,869 | 10/1975 | Ullakko | 179/84 VF |
| 3,937,899 | 2/1976 | Denenberg | 179/84 VF |
| 4,107,475 | 8/1978 | Carlquist et al. | 179/84 VF |

Primary Examiner—James L. Dwyer
Attorney, Agent, or Firm—F. P. Turpin

[57] ABSTRACT

Apparatus for detection of the presence of signalling tones in telephony is provided wherein the output levels for four band-pass filters in the VF band are processed by means of logic circuits to yield a "tone present" decision. Selection of two critical thresholds permits the apparatus to operate optimally within its environment of trading off talk-off immunity with minimum acceptable signal-to-noise ratio.

5 Claims, 3 Drawing Figures

APPARATUS FOR MULTIFREQUENCY SIGNALLING TONE DETECTION

FIELD OF THE INVENTION

The present invention relates generally to signal detectors and particularly to multifrequency signalling tone detectors. More particularly, it relates to the detection of signalling tones in telephony in the presence of speech, echoes and low signal-to-noise ratios without sacrificing good talk-off immunity from near-end speech.

BACKGROUND OF THE INVENTION

Multifrequency tone signalling is an important function in telephone systems. For example, the digits of a telephone number are encoded as combinations of eight different signal frequency tones within the voice frequency (VF) band. It is thus possible to encode a maximum of sixteen different signalling states of which ten represent the ten digits zero to nine. Four of the signalling tones are in the lower portion and the other four are in the upper portion of the VF band. Since these signalling tones fall within the speech (VF) band, the signalling tone detectors or receivers must be able to recognize the occasional presence of a speech signal component at one of the eight signalling tone frequencies as such. This is particularly difficult in the presence of near-end talk-off speech, where high energy signals are often found in the lower portion of the VF band, below, say 800 Hz.

The adverse effects of talk-off speech may be mitigated by raising the signal-to-noise (S/N) ratio threshold below which a signal is not accepted as a signalling tone. This, however, would reduce the sensitivity of tone detection in valid situations where the (S/N) ratio is low, as for example far-end tones in the presence of near-end speech echoes.

The choice of threshold (which yields a trade-off between immunity and minimum S/N ratio necessary for operation) is a matter for the system designer. It should be selected to best suit the environment in which the tone receiver operates. For example, where speech echo is not a problem (where an echo canceller is on the telephone line), the minimum operational S/N ratio may be raised to permit better talk-off immunity.

Whatever the required values of talk-off immunity and minimum S/N ratio, the apparatus of the present invention is a practical device for selecting the optimal combination for the particular system environment.

SUMMARY OF THE INVENTION

The key components of the apparatus provided by the present invention are four frequency bandpass filters:
Low-band filter;
Full-band filter;
Low-tone filter; and
High-tone filter.

All four filters yield at their ultimate outputs an average of the input signal level within the respective band over a predetermined period of time, nominally eight milliseconds (8 msec).

The average levels from the four filters are processed to yield an instantaneous decision at the circuit output indicating presence of a signalling tone.

Accordingly, the present invention provides apparatus for indicating presence of signalling tones in an input signal in presence of noise, comprising: a plurality of filter means each having an output level representative of spectral power within a predetermined frequency band of said input signal; first summing means for subtracting output levels of a first predetermined pair of filters in said plurality of filter means to yield a power difference level; means for calculating the input signal level from output levels of a second predetermined pair of filters in said plurality of filter means; second summing means for subtracting said input signal level from the output level of a predetermined one of said plurality of filter means to yield a signal-to-noise ratio related level; and means for indicating presence of a signalling tone in said input signal when said first and second summing means simultaneously yield levels exceeding predetermined first and second thresholds, respectively.

In particular, the plurality of filter means comprises a full-band filter for said input signal; a low-band filter for a low frequency portion of said input signal; a high-tone filter for high frequency signalling tones in said input signal; and a low-tone filter for low frequency tones in said input signal, thereby permitting adjustment to trade off talk-off immunity and signal-to-noise ratio.

BRIEF DESCRIPTION OF THE DRAWINGS

The preferred embodiment of the present invention will now be described in detail in conjunction with the attached drawings, in which.

DETAILED DESCRIPTION OF THE PREFERRED EMBODIMENT

Figure 1:
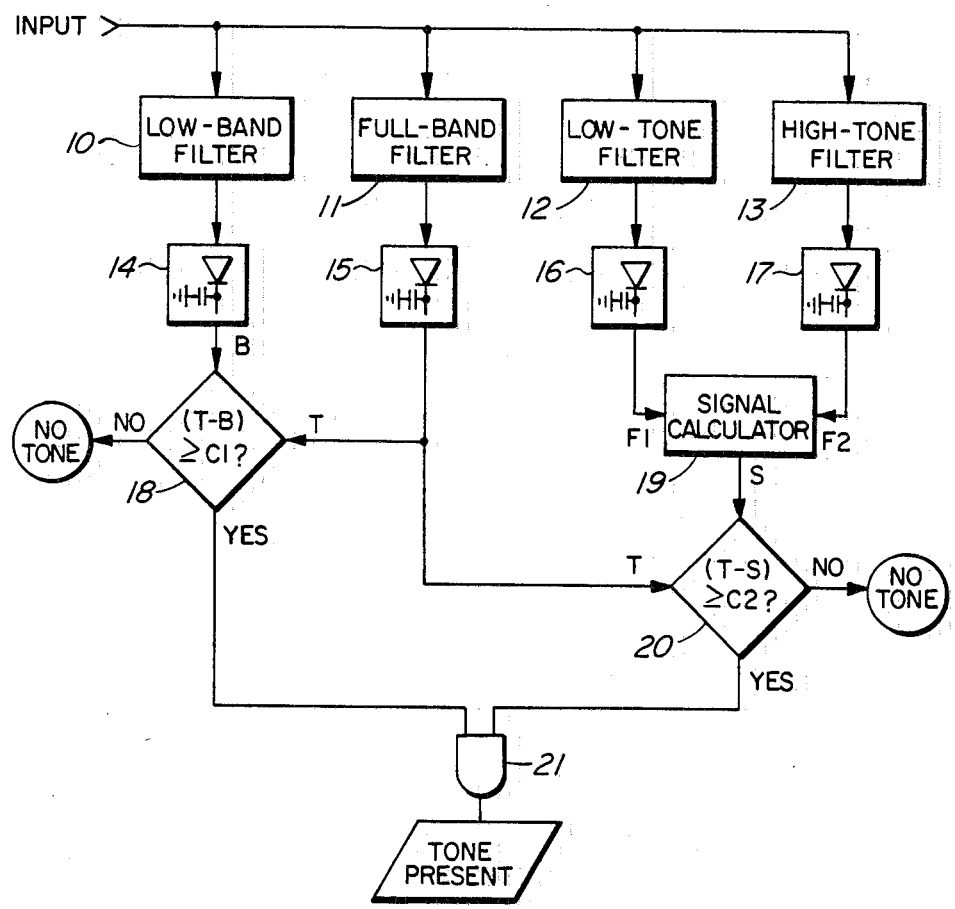
FIG. 1 is a functional block diagram of the tone detection apparatus according to the present invention.

Turning to FIG. 1 of the drawings, the tone detection apparatus comprises a low-band filter 10 for passing frequencies below 800 Hz, a full-band filter 11 for passing the VF band, a low-tone filter 12 for passing the portion of the VF band containing the low-tone frequency of concern, and a high-tone filter 13 for passing the portion of the VF band containing the high-tone frequency of concern. The two filters 12 and 13 are the two out of eight filters that show the highest power at their outputs and, hence, could be any two if no actual signal is present. Each of the filters 10, 11, 12 and 13 is fed by the input signal and has connected to its output a respective one of four rectifier/averager (R/A) circuits 14, 15, 16 and 17, the time-constant of which is 8 msec. The R/A 14 therefore outputs an instantaneous level B representative of the average (over 8 msec) signal power (in the input signal) in the low-band below 800 Hz. Similarly, the other R/As 15, 16 and 17 output instantaneous levels T, F1 and F2, respectively. The four levels B, T, F1 and F2 are processed algebraically and logically either by means of software in a microprocessor (not shown) or by means of hard-wired circuitry. Functionally, the levels B and T are processed as shown in block 18, wherein (T−B) is calculated and if found less than a predetermined Power difference C1 a NO TONE decision is made. If on the other hand (T−B) is equal to or greater than C1, then a conditional YES is given. In this preferred embodiment C1=7.5 dB, for a choice of talk-off immunity of 52%.

The levels F1 and F2 are simultaneously calculated to yield a signal level S in block 19. The level S is defined as follows:

$$S = \max(F1, F2) - \tfrac{5}{8}|F1-F2| + 3 \text{ dB},$$

where $|F1-F2| = \text{abs}(F1-F2)$ and is known in the art as TWIST. In block 20 the difference (T−S) is calculated and if found less than a predetermined constant C2 a NO TONE decision is made. If, however, (T−S) is equal to or greater than C2, then a conditional YES is given. In this preferred embodiment C2=1 dB.

A final TONE PRESENT decision is only given if both the decision blocks 18 and 20 yield simultaneously a conditional YES. This is a co-function and is indicated by AND gate 21.

As will be appreciated by those skilled in the art, the power difference (T−B)=C1 is a power representative of speech content, while the power difference (T−S)=C2 is representative of the signal-to-noise (S/N) ratio. It can be shown that $$(T-S) = 10 \log(1 + 10^{0.1(S/N)}) - S/N,$$

which yields C2=1 dB for S/N=6 dB.

The advantage of using software to perform the decisions is the ease with which the constants C1 and C2 may be altered to suit the particular environment in which the apparatus is operating, preferably after some field trial.

For some applications, possibly for reasons of cost and/or reliability, full hardware realization of the apparatus may be desirable. In that case, the decision blocks 18, 19 and 20 may be realized as shown in FIGS. 2 and 3.

Figure 2:
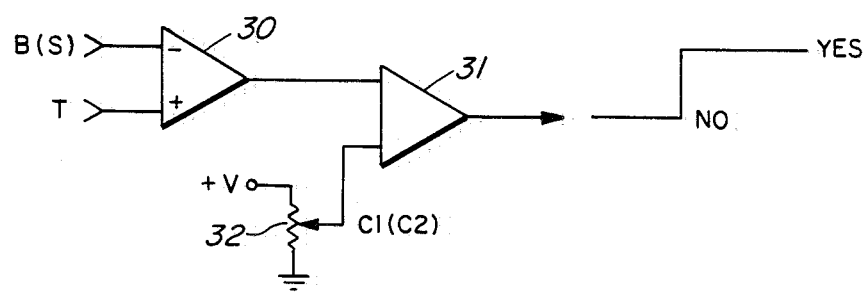
FIG. 2 is a band-wave realization of a portion of the apparatus shown in FIG. 1.

FIG. 2 shows a simple hardware realization of the blocks 18 and 20. A differential amplifier 30 generates the difference (T−B) (or (T−S)), which difference is compared in comparator 31 to a reference level representing C1 (or C2), and which is set by potentiometer 32. The output of the comparator yields YES when C1 (or C2) is exceeded.

Figure 3:
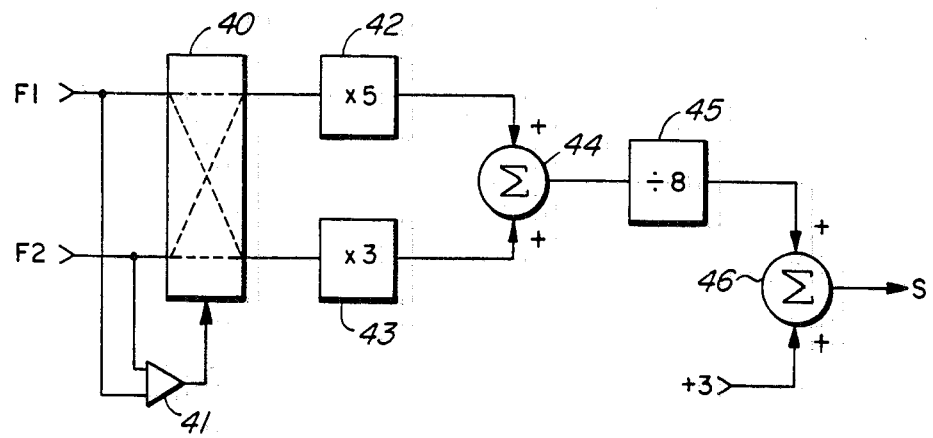
FIG. 3 is a functional block-diagram of the signal calculator shown in FIG. 1.

In FIG. 3, realization of the signal calculator 19 is shown schematically. The levels F1 and F2 are connected via a transfer switch 40, which is controlled by comparator 41, to multiplexers 42 and 43, respectively, or vice versa, depending on whether F1>F2 or F1<F2. Summer 44 subtracts the output of the multiplexer 42 from that of the multiplexer 43, which difference is divided by eight in divider 45. The result from the divider 45 is subtracted from three to yield the signal level S in summer 46. The circuit shown in FIG. 3 calculates as follows:

For F1>F2
$$\text{ti } S = \tfrac{3}{8}F1 + \tfrac{5}{8}F2 + 3 \text{ dB}$$

For F1<F2
$$\text{ti } S = \tfrac{3}{8}F2 + \tfrac{5}{8}F1 + 3 \text{ dB}.$$

What is claimed is:

1. Apparatus for indicating of signalling tones in an input signal in presence of noise, comprising:
    a plurality of filter means each having an output level representative of spectral power within a predetermined frequency band of said input signal;
    first summing means for subtracting output levels of a first predetermined pair of filters in said plurality of filter means to yield a power difference level;
    means for calculating the input level from output levels of a second predetermined pair of filters in said plurality of filter means;
    second summing means for subtracting said input signal level from the output level of a predetermined one of said plurality of filter means to yield a signal-to-noise ratio related level; and
    means for indicating presence of a signalling tone in said input signal when said first and second summing means simultaneously yield levels exceeding predetermined first and second thresholds, respectively.

2. The apparatus for indicating presence of signalling tones in an input signal in the presence of noise as defined in claim 1, said plurality of filter means comprising:
    a full-band filter for said input signal;
    a low-band filter for a low frequency portion of said input signal;
    a high-tone filter for high frequency signalling tones in said input signal, and
    a low-tone filter for low frequency tones in said input signal, thereby permitting adjustment to trade off talk-off immunity and signal-to-noise ratio.

3. The apparatus for indicating presence of signalling tones in an input signal in the presence of noise as defined in claim 2, said first predetermined pair of filters being said full-band and low-band filters.

4. The apparatus for indicating presence of signalling tones in an input signal in the presence of noise as claimed in claim 3, such second predetermined pair of filters being said low-tone and high-tone filters.

5. The apparatus for indicating presence of signalling tones in an input signal in the presence of noise as claimed in claim 4, said predetermined one of said plurality of filter means being said full-band filter.

* * * * *